(No Model.) 2 Sheets—Sheet 1.
G. E. WATSON & G. T. CHESTER.
APPARATUS FOR SEPARATING DUST FROM AIR.
No. 302,608. Patented July 29, 1884.
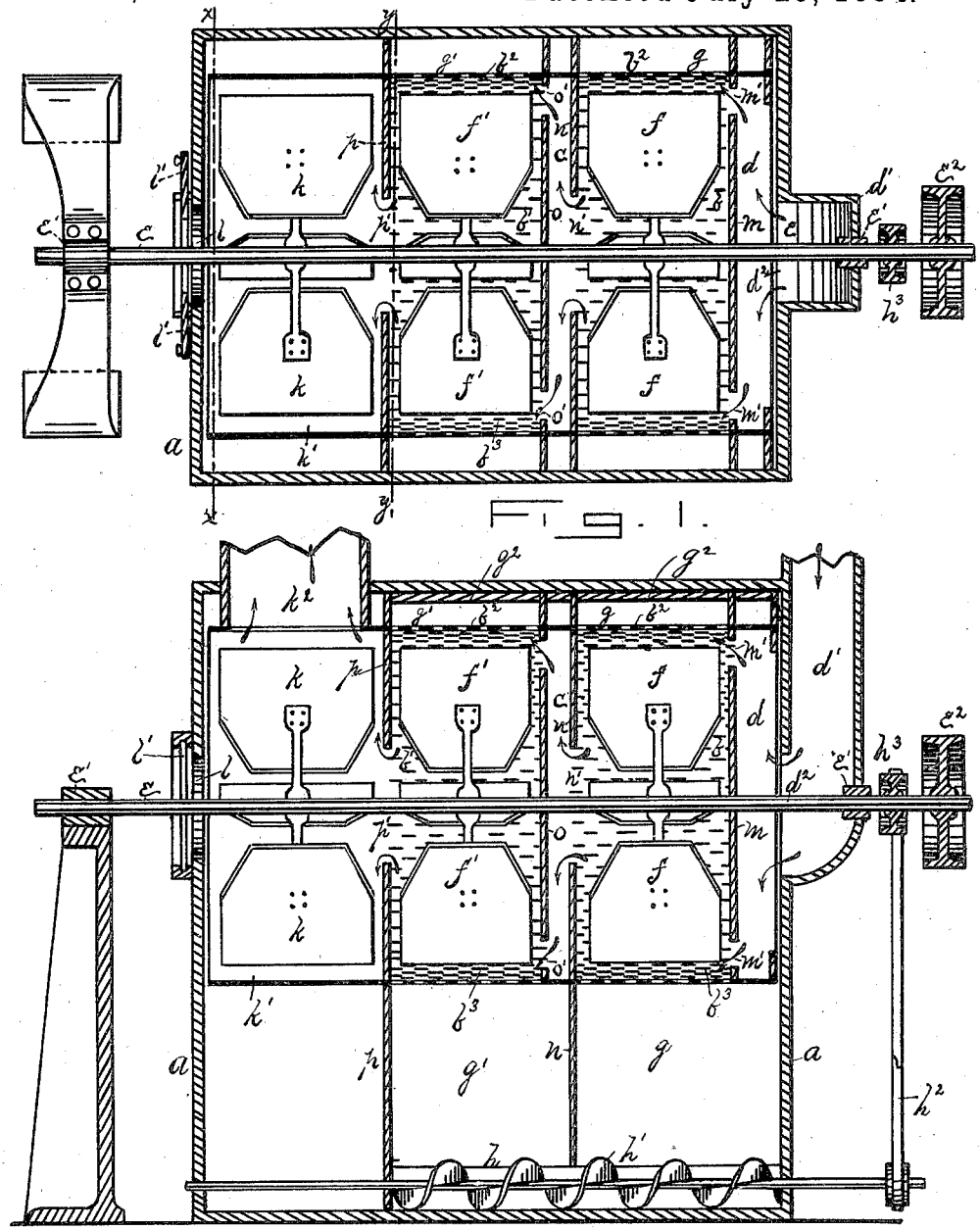
Witnesses:
Otto Hoddick.
A. T. Vickson.
Inventor
George E. Watson
George T. Chester
By W. T. Miller
Attorney

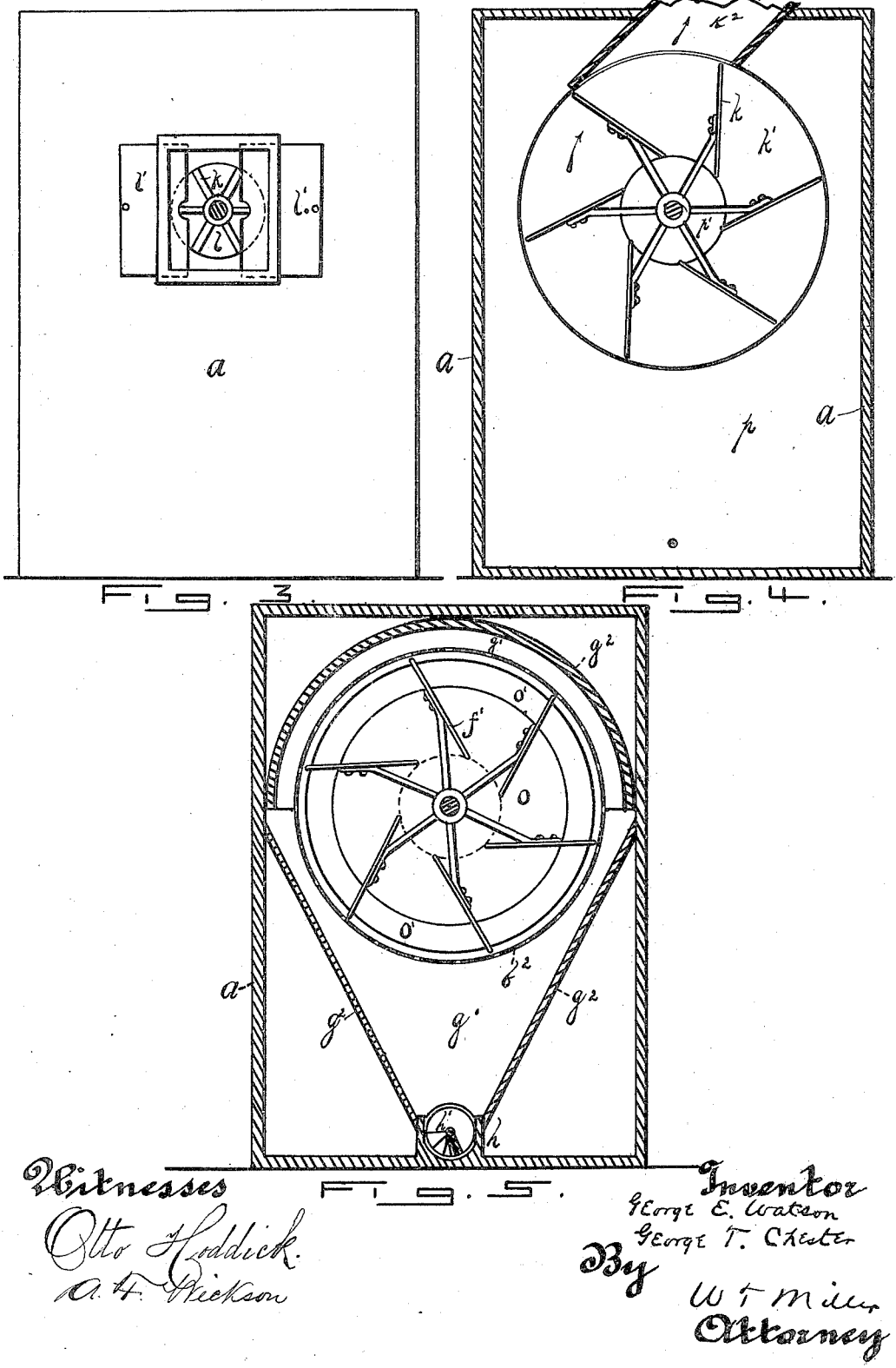

UNITED STATES PATENT OFFICE.

GEORGE E. WATSON, OF LOCKPORT, AND GEORGE T. CHESTER, OF BUFFALO, NEW YORK; SAID WATSON ASSIGNOR TO SAID CHESTER.

APPARATUS FOR SEPARATING DUST FROM AIR.

SPECIFICATION forming part of Letters Patent No. 302,608, dated July 29, 1884.

Application filed April 11, 1884. (No model.)

*To all whom it may concern:*

Be it known that we, GEORGE E. WATSON, residing at Lockport, in the county of Niagara, and GEORGE T. CHESTER, residing at Buffalo, in the county of Erie, and State of New York, both citizens of the United States, have invented certain new and useful Improvements in Apparatus for Separating Dust from Air; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain improvements in that class of machines employed in freeing from air the dust which is taken by suction from the different machines of flouring-mills, where such separation is effected, substantially by driving the dust-particles out of the air-current by centrifugal force into a closed receiving-chamber, while the air which has been freed from dust is permitted to escape in a different direction. The apparatus heretofore employed for this purpose has consisted, substantially, of a revolving fan or series of beaters operating in a single closed receiving-chamber having an inner perforated wall surrounding such fan or beaters, and inlet and outlet openings, through which the dust-laden air is conducted to the beaters, and the purified air is permitted to escape therefrom, and an auxiliary suction-fan to draw the dust-laden air through the separator.

The object of our improvements upon the mechanism just outlined is to effect a much more thorough and complete separation of the dust from the air; and to that end they consist, substantially, of a series of two or more revolving fans or sets of beaters, each inclosed in a separate receiving-chamber, through which series of receiving-chambers the dust-laden air is successively conducted, the dust-laden air from the first of such chambers being drawn therefrom at or near the axis of the revolving fan or beater, and by suitable means conducted to the periphery of the next succeeding fan or set of beaters, and so on through the series, by means of which operation a graduated and finally complete separation of the dust from the air is effected, the amount of dust separated diminishing rapidly from the first receiving-chamber to the next, and being entirely and completely removed in the last receiving-chamber, leaving absolutely nothing but air to pass into the chamber inclosing the suction-fan.

Our invention further consists in certain details of construction which will be more fully hereinafter described and claimed.

In the drawings, Figure 1 is a sectional plan of the apparatus, taken longitudinally. Fig. 2 is a sectional elevation of the same, taken longitudinally. Fig. 3 is an end elevation. Fig. 4 is a vertical transverse section taken in the line $x\ x$, Fig. 1; and Fig. 5 is a similar section taken in the line $y\ y$, Fig. 1.

Referring to the drawings, $a$ is the casing which incloses the apparatus. Within this casing are the receiving-chambers $b\ b'$, preferably two in number—the intermediate passage, $c$, between the receiving-chambers, and the passage $d$, which first receives the dust-laden air as it is introduced into the apparatus from the conduit $d'$. Passing centrally through these chambers is the horizontal shaft $e$, resting in bearings $e'\ e'$, and $e^2$ is the driving-pulley thereon. Upon this shaft, and within the receiving-chambers $b'\ b'$, are the fans or beaters $f\ f'$, whose outer edges are in close proximity to the cylindrical walls $b^2$ of such chambers. These cylindrical walls are provided with series of slots $b^3$ throughout their entire surface, for the passage therethrough of the dust, as will be more fully hereinafter explained.

Surrounding the receiving-chambers $b$ and $b'$ are the separate dust-collecting chambers $g\ g'$. The outer walls, $g^2$, of these chambers, above the shaft $e$, are concentric with the perforated walls $b^2$ of the receiving-chambers, and below such shaft they converge in the form of a hopper to a common conveyer-trough, $h$, within which is revolved the spiral conveyer $h'$ by means of the belt $h^2$, which passes from a pulley on the conveyer to the pulley $h^3$ upon the shaft $e$.

$k$ is a suction-fan secured to the shaft $e$, and revolving within the casing $k'$ adjacent to the receiving-chamber $b'$, and $k^2$ is its discharge-tube.

$l$ is an opening in the casing $a$, extending into the fan-casing $k'$. It is preferably located so as to be concentric with the shaft $e$, and is provided with adjustable slides or gates $l'$ $l'$.

The chambers $b$ $b'$ and passages $c$ and $d$ communicate with each other in the following manner: The partition $m$, which separates the passage $d$ from the first receiving-chamber, $b$, is provided with the annular opening $m'$, located near the wall $b^2$ of the chamber, and is designed to conduct the dust-laden air from the passage $d$ to the periphery of the fan $f$. The next partition $n$ between the chamber $b$ and intermediate passage, $c$, has a central circular opening surrounding the shaft $e$. This partition $n$ is carried down to the conveyer-trough $h$, and serves as the dividing-wall between the chambers $g$ and $g'$. The next partition, $o$, (between the passage $c$ and chamber $b'$,) with its annular opening $o'$, is similar to the first partition, $m$, and the remaining partition, $p$, between the chamber $b'$ and the fan-casing $k'$ is provided with the central circular opening $p'$. This partition $p$ is carried down to the bottom of the casing $a$, and forms the outer wall of the chamber $g'$. All of the partitions just described extend to the upper cylindrical wall, $g^2$, of the dust-collecting chambers.

The dust-laden air to be operated upon is taken up by the conduit $d'$ at the middlings-purifier or other machine, and conducted into the passage $d$ through the central orifice, $d^2$; from thence it passes through annular opening $m'$ to the periphery of the first fan, $f$, by means of which it is rapidly revolved within the chamber $b$, the centrifugal action of the fan $f$ causing the dust to be projected against the perforated wall $b^2$, through which the main body of the dust passes. When in the surrounding chamber $g$, it falls and is collected in the trough $h$. The air and what dust remains with it pass from the chamber $b$ through central opening $n'$ into the intermediate passage, $n$, from whence it is conducted by means of annular opening $o'$ into the next chamber, $b'$, where the centrifugal separation again takes place, and the remaining dust is thoroughly separated from the air, which passes on through central opening $p'$ into the suction-chamber $k'$, from whence it is discharged through tube $k^2$. The separated dust from chamber $b'$ is collected in the common conveyer-trough, $h$, and, together with that from the first chamber, $g$, is discharged from such common trough by means of any suitable trapped valve (not herein shown) which will allow the dust to be removed without liberating the air within the chamber, as it is essential to the perfect working of the apparatus that there shall be no openings in the dust-collecting chambers.

We have found in practice that it is impossible to effect a complete separation of the dust from the air in one operation, notably where the air is heavily charged with dust, as is invariably the case in the use of machines of this class, for by reason of clogging more or less of the light dust-particles will fail to penetrate the perforated wall of the separating-chamber, and will be carried out with the air; hence it is necessary that a graduated separation should take place, which we have found is thoroughly and effectively accomplished by providing a series of separating-chambers having intermediate passages for conducting the dust-laden air from a point near the axis of the first separating-chamber to the periphery of the fan or beaters in the next succeeding separating-chamber, and so on; and as in this graduated process the amount of dust to be separated decreases rapidly from the first to the second separating-chamber, the centrifugal separating action, which in the first chamber is invariably retarded by the clogging of the dust at the perforations, is free and complete in the second chamber.

We have herein shown our apparatus as provided with two separating-chambers, which we have found in practice to be quite sufficient for the work required; but one or more additional chambers could be employed where a heavier mixture of dust and air is to be separated.

Another important improvement in our apparatus is the adjustable opening in the suction-fan casing, for with it the force of the suction-blast through the separator can be quickly and accurately tempered to the quality of the mixture of dust and air being operated upon, as by adjusting the opening by means of the sliding gates a counter-blast of more or less force can be admitted to the suction-fan casing, which will correspondingly reduce the force of suction through the separator.

We claim—

1. In a machine for separating dust from air by centrifugal force, the combination of a series of two or more separate fans or sets of beaters, separate perforated receiving-chambers provided with intermediate passages, through which the dust-laden air is conducted from the first receiving-chamber at or near the axis of its revolving fan or beater, and passed to the periphery of the next succeeding fan or beater, and separate collecting-chambers, by means of which a graduated separation of the dust from the air is effected, substantially as shown and described.

2. In a machine for separating dust from air by centrifugal force, the combination of a series of two or more separate fans or sets of beaters, separate perforated receiving-chambers provided with intermediate passages, through which the dust-laden air is conducted from the first receiving-chamber at or near the axis of its revolving fan or beater, and passed to the periphery of the next succeeding fan or beater, by means of which a graduated separation of the dust from the air is effected, a separate collecting-chamber surrounding each receiving-chamber, a conveyer-trough, and a conveyer, substantially as shown and described.

3. In a machine for separating dust from air by centrifugal force, the combination of a series of two or more separate fans or sets of beaters, separate perforated receiving-chambers provided with intermediate passages, through which the dust-laden air is conducted from the first receiving-chamber at or near the axis of its revolving fan or beater, and passed to the periphery of the next succeeding fan or beater, separate collecting-chambers, and a suction-fan casing provided with an adjustable opening for the admission of a counter-blast, substantially as shown, and for the purpose stated.

4. In a machine for separating dust from air by centrifugal force, the combination of a series of two or more separate fans or sets of beaters, separate perforated receiving-chambers provided with intermediate passages, through which the dust-laden air is conducted from the first receiving-chamber at or near the axis of its revolving fan or beater, and passed to the periphery of the next succeeding fan or beater, a suction-fan casing provided with an adjustable opening for the admission of a counter-blast, a separate collecting-chamber surrounding each receiving-chamber, a conveyer-trough, and a conveyer, substantially as shown and described.

In testimony whereof we have signed our names to this specification in the presence of two subscribing witnesses.

GEORGE E. WATSON.
GEORGE T. CHESTER.

Witnesses:
W. T. MILLER,
OTTO HODDICK.